(12) United States Patent
Taketomi

(10) Patent No.: US 10,805,590 B2
(45) Date of Patent: Oct. 13, 2020

(54) IMAGE DISPLAY APPARATUS AND IMAGE DISPLAY METHOD

(71) Applicant: CANON KABUSHIKI KAISHA, Tokyo (JP)

(72) Inventor: Yuzo Taketomi, Hiratsuka (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 126 days.

(21) Appl. No.: 15/394,561

(22) Filed: Dec. 29, 2016

(65) Prior Publication Data

US 2017/0208313 A1 Jul. 20, 2017

(30) Foreign Application Priority Data

Jan. 20, 2016 (JP) .................. 2016-009307

(51) Int. Cl.
| | | |
|---|---|---|
| *H04N 13/128* | (2018.01) | |
| *H04N 13/327* | (2018.01) | |
| *H04N 13/324* | (2018.01) | |
| *H04N 13/344* | (2018.01) | |
| *H04N 13/366* | (2018.01) | |
| *H04N 13/398* | (2018.01) | |

(52) U.S. Cl.
CPC ......... *H04N 13/128* (2018.05); *H04N 13/324* (2018.05); *H04N 13/327* (2018.05); *H04N 13/344* (2018.05); *H04N 13/366* (2018.05); *H04N 13/398* (2018.05)

(58) Field of Classification Search
None
See application file for complete search history.

(56) References Cited

U.S. PATENT DOCUMENTS

| | | | | |
|---|---|---|---|---|
| 10,168,772 | B2 * | 1/2019 | Kim .................. | G06F 3/013 |
| 10,271,042 | B2 * | 4/2019 | Rougeaux .......... | G02B 27/0172 |
| 2012/0162764 | A1 * | 6/2012 | Shimizu .................. | G02B 7/12 |
| | | | | 359/473 |
| 2013/0187943 | A1 * | 7/2013 | Bohn .................. | G02B 27/0093 |
| | | | | 345/619 |
| 2014/0184496 | A1 * | 7/2014 | Gribetz ................ | G02B 27/017 |
| | | | | 345/156 |
| 2014/0325677 | A1 * | 10/2014 | Kotla ...................... | G06F 21/36 |
| | | | | 726/28 |
| 2015/0205135 | A1 * | 7/2015 | Border ............... | G02B 27/0172 |
| | | | | 359/630 |
| 2016/0005229 | A1 * | 1/2016 | Lee ........................ | G06F 3/0488 |
| | | | | 345/419 |
| 2016/0328884 | A1 * | 11/2016 | Schowengerdt ......... | G02B 6/32 |

(Continued)

FOREIGN PATENT DOCUMENTS

| | | |
|---|---|---|
| JP | 9-304729 A | 11/1997 |
| JP | 11-352439 A | 12/1999 |

(Continued)

*Primary Examiner* — Chikaodili E Anyikire
(74) *Attorney, Agent, or Firm* — Canon U.S.A., Inc. IP Division

(57) ABSTRACT

An image display apparatus is worn by a user in such a manner that a first image and a second image are displayed on display units corresponding to both of the user's eyes, wherein, at corresponding positions in the first and the second images, the display units display test patterns including the same graphics that enable the user to adjust the wearing position of the image display apparatus.

17 Claims, 8 Drawing Sheets

(56) References Cited

U.S. PATENT DOCUMENTS

2017/0122727 A1* 5/2017 Bismuth .................. A41H 1/02
2017/0188021 A1* 6/2017 Lo ........................... H04N 3/08

FOREIGN PATENT DOCUMENTS

| JP | 2000-235162 A | 8/2000 |
| JP | 2003-337299 A | 11/2003 |
| JP | 2008-003500 A | 1/2008 |
| JP | 05129377 B1 | 1/2013 |

* cited by examiner

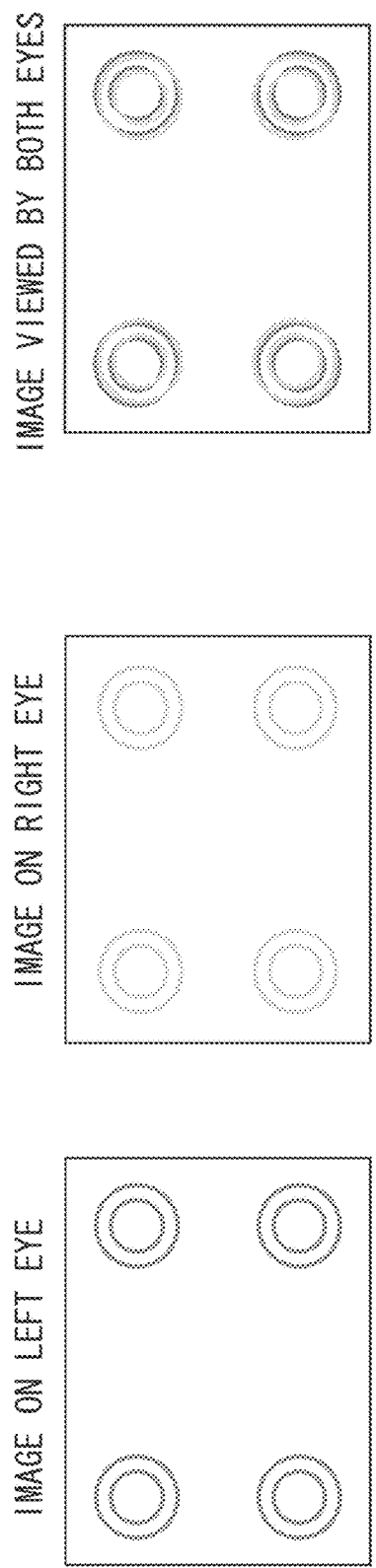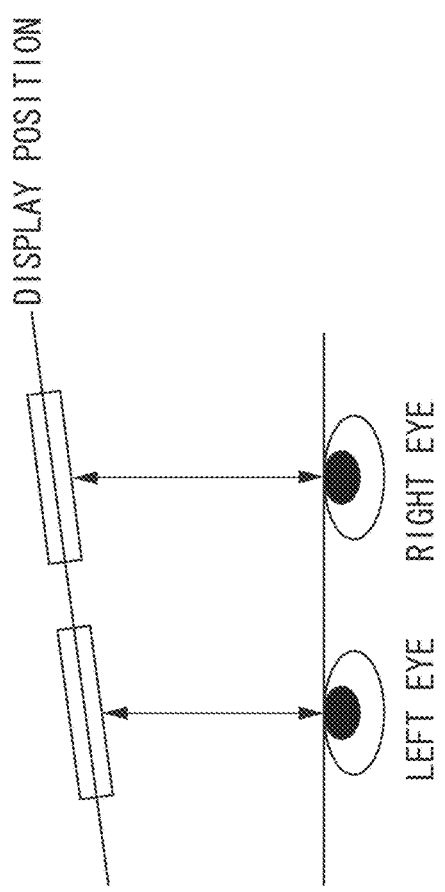
FIG. 7A
FIG. 7B

IMAGE DISPLAY APPARATUS AND IMAGE DISPLAY METHOD

BACKGROUND

Field

The present disclosure relates to a technique for displaying images on an image display apparatus mounted on a user's head.

Description of the Related Art

A conventional Head Mounted Display (HMD) has been known to display images on a user's left and right eyes. Such an HMD needs to be mounted at the correct position so that the left and right display images naturally overlap each other. If the HMD is not suitably mounted, the left and right display images will be shifted from each other.

Japanese Patent Application Laid-Open No. 9-304729 discusses a configuration for solving such a problem. In this configuration, different images are displayed on the left and right screens of an HMD, and the wearing position of the HMD is adjusted so that a predetermined shape appears when positioning data included in these images is viewed by both eyes. Japanese Patent Application Laid-Open No. 11-352439 discusses a configuration in which horizontal lines are displayed at different positions in the left and right screens of an HMD, and the wearing position of an HMD is adjusted so that these lines appear as a set of parallel lines.

However, in the techniques discussed in both Japanese Patent Application Laid-Open No. 9-304729 and Japanese Patent Application Laid-Open No. 11-352439, line test patterns are displayed to enable adjustment of the wearing position of the HMD. With such line test patterns, if the left and right images are shifted in the depth direction, it is hard to perceive a change in the test patterns arising from a change in the depth direction, and a user can find difficulty in accurately adjusting the wearing position of the HMD. What is needed is an image display apparatus that accurately adjusts the wearing position of an HMD even if the left and right images of the HMD are shifted in the depth direction.

SUMMARY

According to an aspect of the present invention, an image display apparatus includes a first display device, corresponding to the left eye of a user, configured to display a first image, a second display device, corresponding to the right eye of the user, configured to display a second image, and a control unit configured to perform control to display patterns having a same shape at corresponding positions in the first and the second images.

Further features will become apparent from the following description of exemplary embodiments with reference to the attached drawings.

BRIEF DESCRIPTION OF THE DRAWINGS

FIGS. 7A and 7B illustrate how the test patterns appear when the HMD is worn at an unsuitable position according to the second exemplary embodiment.

DESCRIPTION OF THE EMBODIMENTS

A first exemplary embodiment will be described in detail below with reference to the accompanying drawings. The present exemplary embodiment provides an example image display system in a Virtual Reality (VR) system for reproducing computer graphics (CG) images on a Head Mount Display (HMD). However, this system is not seen to be limiting and, for example, a system supporting Mixed Reality (MR) that is a technology for seamlessly mixing real space and virtual space in real time is applicable.

Figure 1:
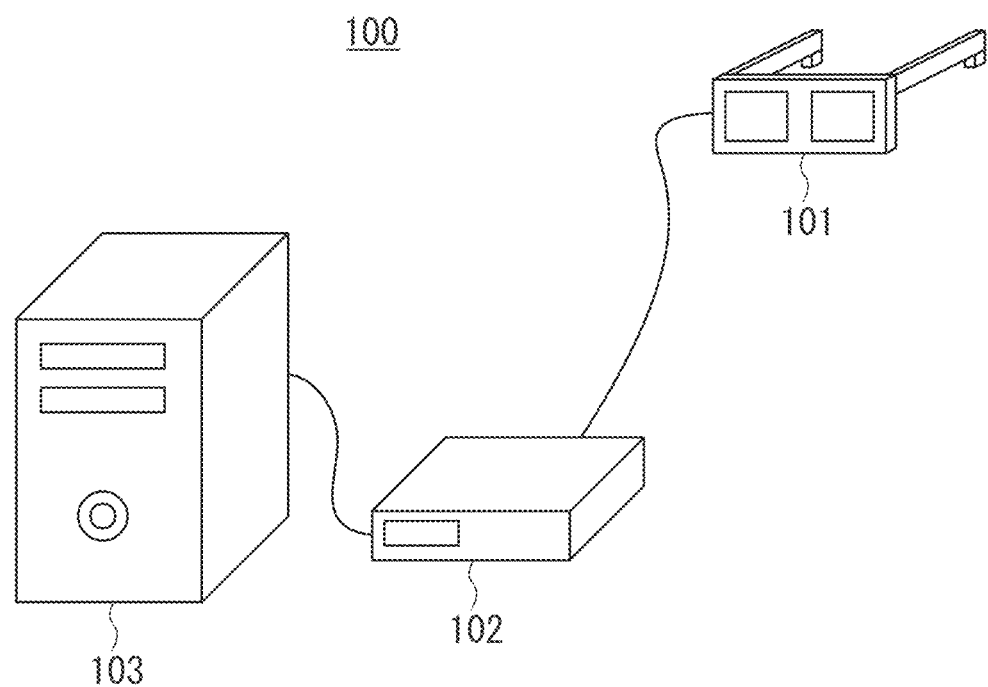
FIG. 1 is a schematic view illustrating a configuration of an image display system according to a first exemplary embodiment.

FIG. 1 is a schematic view illustrating a configuration of the image display system according to the present exemplary embodiment. Referring to FIG. 1, an image display system 100 includes a HMD 101, a controller 102, and an image generation apparatus 103.

Figure 2:
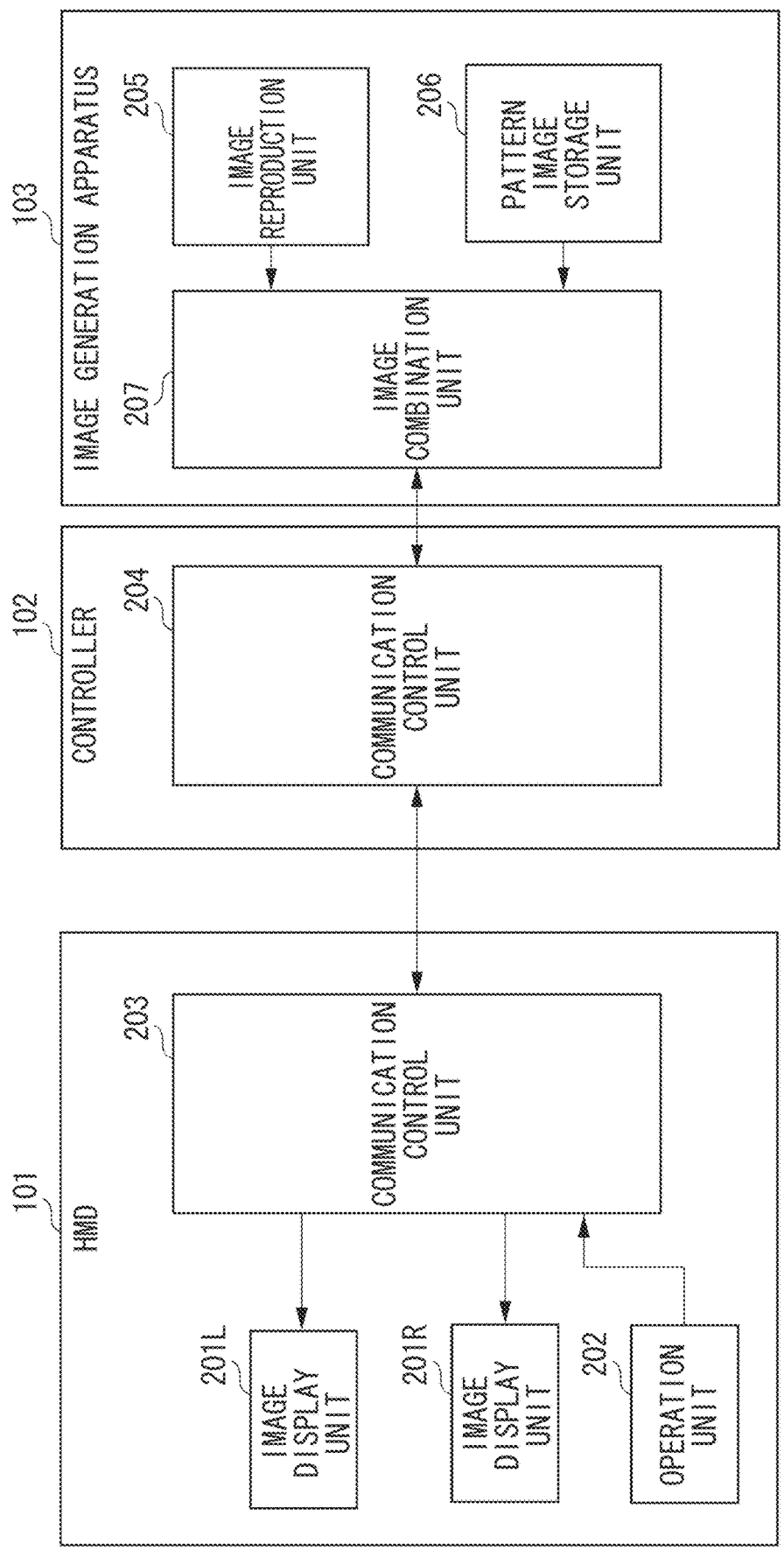
FIG. 2 is a block diagram schematically illustrating the image display system according to the first exemplary embodiment.

FIG. 2 is a block diagram schematically illustrating the image display system according to the present exemplary embodiment. The HMD 101 is attached to a user's head or face. The HMD 101 includes image display units 201L and 201R respectively corresponding to the user's left and right eyes. The image display units 201L and 201R respectively acquire a first image and a second image, generated by an image generation apparatus 103 (described below), via a communication control unit 203 and display the images. More specifically, the image display units 201L and 201R respectively include a display device, such as a liquid crystal display and an organic electroluminescence (EL) display, and an optical system for displaying an image to be displayed on the display device in front of each of the user's left and right eyes.

The HMD 101 further includes the communication control unit 203 for communicating with the controller 102. The communication control unit 203, in addition to receiving and transmitting control signals, receives the first and the second images generated by the image generation apparatus 103 and displayed on the image display units 201L and 201R, respectively. The communication control unit 203 can be based only either a wired communication system as illustrated in FIG. 1 or on a wireless communication system (not illustrated).

The HMD 101 includes an operation unit 202 that receives operations from an HMD user and processes adjustments of the wearing position of the HMD 101 (described below). Adjustments are performed based on user's instructions issued on the operation unit 202.

The controller 102 includes the communication control unit 204 that controls communication with the HMD 101 and the image generation apparatus 103. According to the present exemplary embodiment, the controller 102 and the image generation apparatus 103 are configured as separate units. However, the controller 102 and the image generation apparatus 103 can be integrally configured as one unit.

The image generation apparatus 103 is connected with the controller 102 via a wire, and can be a personal computer (PC) or a workstation (WS). The image generation apparatus 103 includes an image reproduction unit 205 that reproduces content images (first and second images) to be displayed on the image display units 201L and 201R of the HMD 101, respectively. The image generation apparatus 103 also includes a pattern image storage unit 206 that stores the test patterns used when the user adjusts the wearing position of the HMD 101, and an image combining unit 207 that combines the test patterns with the content images.

The image generation apparatus 103 includes hardware components such as a central processing unit (CPU), a read only memory (ROM), a random access memory (RAM), and a hard disk drive (HDD). Processing of flowcharts related to the above-described functional configurations and apparatuses are, for example, implemented when the CPU executes a program stored in the ROM and the HDD. The RAM includes a storage area that functions as a work area used by the CPU to load and execute a program. The ROM includes a storage area that stores programs to be executed by the CPU. The HDD includes a storage area that stores various data including various programs required by the CPU to execute processing.

In the above-described configuration, the content images reproduced by the image reproduction unit 205 of the image generation apparatus 103 pass through the image combining unit 207 and are transmitted to the HMD 101 via the communication control unit 204 of the controller 102, which is connected with the image generation apparatus 103 via a wire. The image combining unit 207 normally outputs the input content images as they are. This enables the HMD 101 user to view, on the HMD 101, the content images reproduced by the image generation apparatus 103.

When an instruction is issued from the HMD 101 user via the operation unit 202, the image combining unit 207 combines the content images with the test pattern images input from the pattern image storage unit 206 and outputs the combined images. The HMD 101 receives the combined images via the controller 102 and displays the images on the image display units 201L and 201R. This enables the HMD 101 user to easily adjust shifting the wearing position of the HMD 101.

Although the example image display system illustrated in FIGS. 1 and 2 includes the HMD 101, the controller 102, and the image generation apparatus 103, the HMD 101 can include all of these functions of the image display system and function as a single unit. Although the above-described example image display system supports VR, the present exemplary embodiment is also applicable to an image display system supporting MR. For example, a video see-through type HMD captures a real space within the field of view of the HMD user by using respective cameras corresponding to the left and right eyes, and sends image data of the captured real space to the image generation apparatus 103. Then, the image generation apparatus 103 generates content images by superimposing a CG image onto the images captured by the cameras of the HMD 101, and transmits the generated content images to the HMD 101 to enable them to be observed on the HMD 101.

Figure 3A:
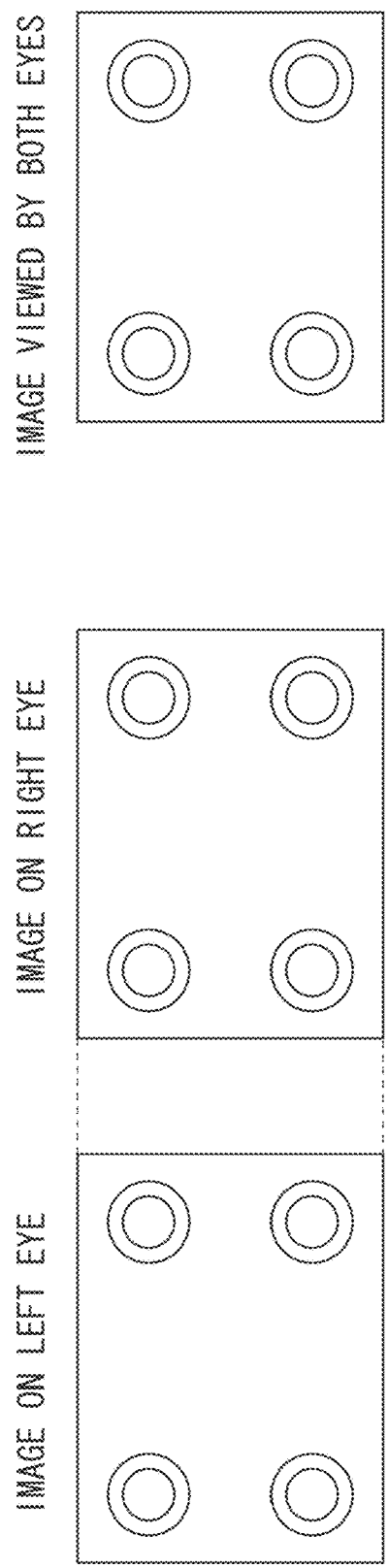
FIGS. 3A and 3B illustrate how test patterns appear when a Head Mount Display (HMD) is worn at the suitable position according to the first exemplary embodiment.
Figure 3B:
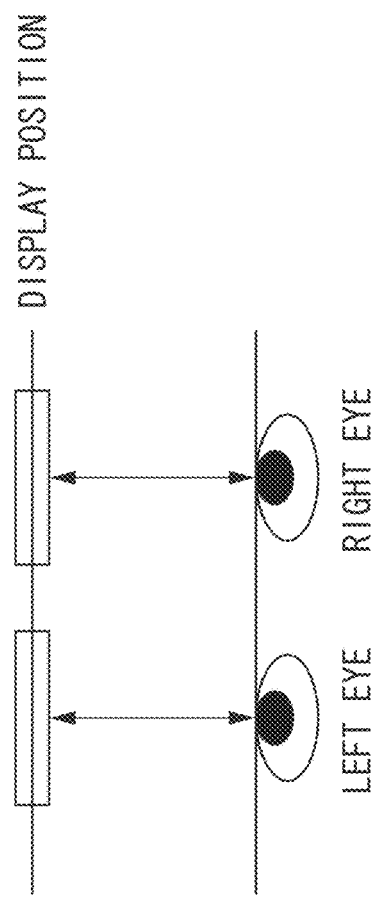

An overview of test patterns for adjusting the wearing position of the HMD 101 according to the present exemplary embodiment will be described below with reference to FIGS. 3A, 3B, 4A, and 4B. FIGS. 3A and 3B illustrate how the test patterns appear when the user wears the HMD 101 at the suitable position. As illustrated in FIG. 3A, according to the present exemplary embodiment, patterns having the same graphics are displayed at the same corresponding positions in the images on the right and left eyes (first and second images) at the same timing.

More specifically, test patterns having four graphics of double circles are displayed at the corresponding positions in the images on the right and left eyes (first and second images). Although the test patterns need to be displayed at one or more corresponding positions in respective images, it is desirable that the corresponding position is a circumferential position of the images. The circumference of an image is largely affected by aberration due to the position of the pupil. How the test patterns appear is changed even by a small amount of shifting of the wearing position of the HMD 101.

At least two test patterns are displayed at positions of point symmetry with respect to the center of each image. Test patterns are displayed at the four corners of each image. This enables the HMD 101 user to easily perceive shifting of the wearing position of the HMD 101.

FIG. 3B illustrates that, when the user wears the HMD 101 at the suitable position, the image display units 201L and 201R are at positions directly facing the user's left and right eyes, respectively. Referring to FIG. 3B, since the image display units 201L and 201R according to the present exemplary embodiment each include an optical system, the display positions illustrated therein are equivalent to positions of the respective optical systems of the image display units 201L and 201R. In this state, as illustrated in FIG. 3A, the same test patterns are displayed at the same corresponding positions on the image display units 201L and 201R facing the left and right eyes. Therefore, when the user views the images with both eyes, the user perceives these images in an overlapping way. According to the present exemplary embodiment, the above-described configuration enables the user to confirm that the HMD 101 is worn at the suitable position.

Figure 4A:
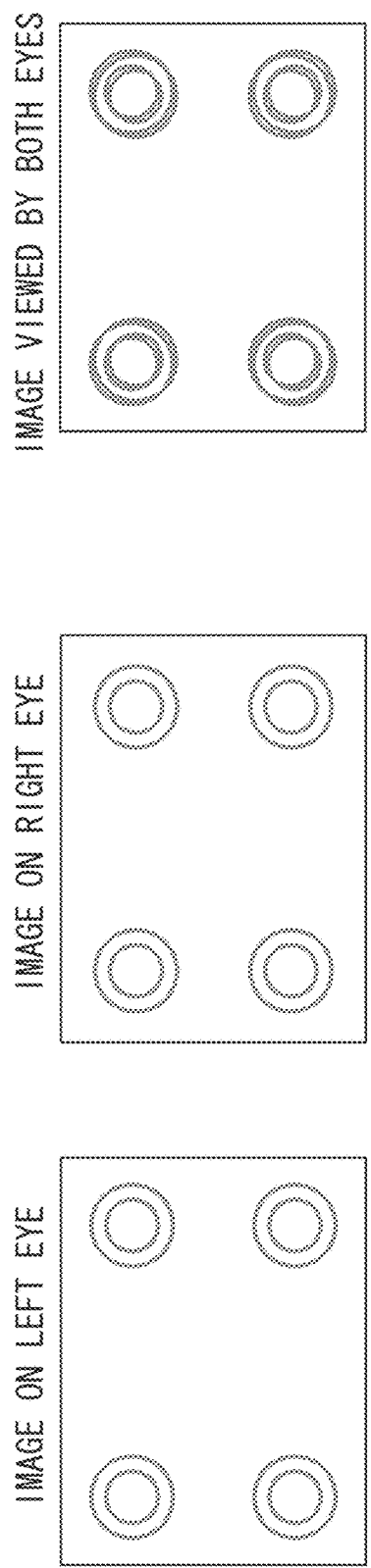
FIGS. 4A and 4B illustrate how the test patterns appear when the HMD is worn at an unsuitable position according to the first exemplary embodiment.
Figure 4B:
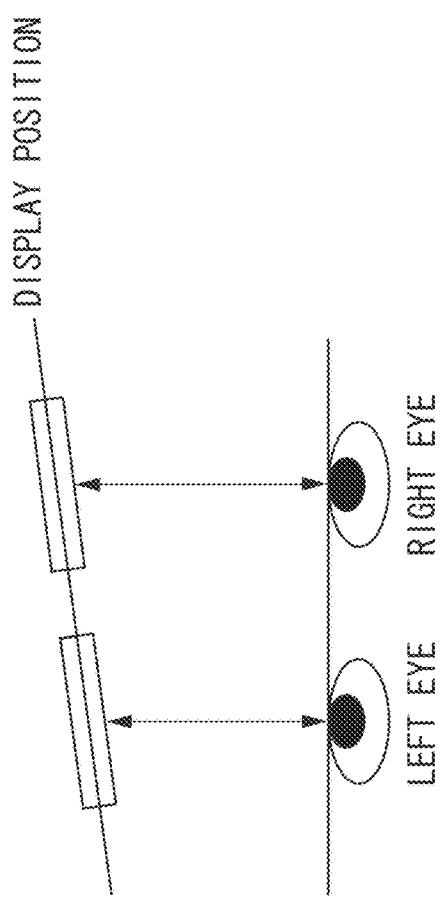

FIGS. 4A and 4B illustrate how the test patterns appear when the user wears the HMD 101 at an unsuitable position. If the user does not wear the HMD 101 at the suitable position, the positions of both the user's eyes can be shifted from the positions of the image display units 201L and 201R in the depth direction. FIG. 4B illustrates a state where such a shift in the depth direction occurs. In this state, the image display unit 201L is closer to the user's left eye than the suitable position is, and the image display unit 201R is farther from the user's right eye than the suitable position is.

In such a state, the positional relation between the user's left eye and the image display unit 201L and the positional relation between the user's right eye and the image display unit 201R are different from the positional relation corresponding to suitable setting values. Therefore, as illustrated in FIG. 4A, the test patterns in the images for the left and right eyes respectively displayed on the image display units 201L and 201R through the optical systems appear blurry. The positional relation between the user's left eye and the image display unit 201L differs from the positional relation between the user's right eye and the image display unit 201R. Therefore, even if the test pattern images having the same graphics are displayed on the image display units 201L and 201R, the left and right images blur in different ways. As a result, when viewed by both the user's eyes, the test patterns appear blurry as illustrated in FIG. 4A. According to the present exemplary embodiment, the user can confirm that the wearing position of the HMD 101 shifts from a suitable position. In this case, the user can easily correct the wearing position by adjusting the wearing position of the HMD 101 to a position where the test patterns displayed on the image display units 201L and 201R appear clear.

Figure 5:
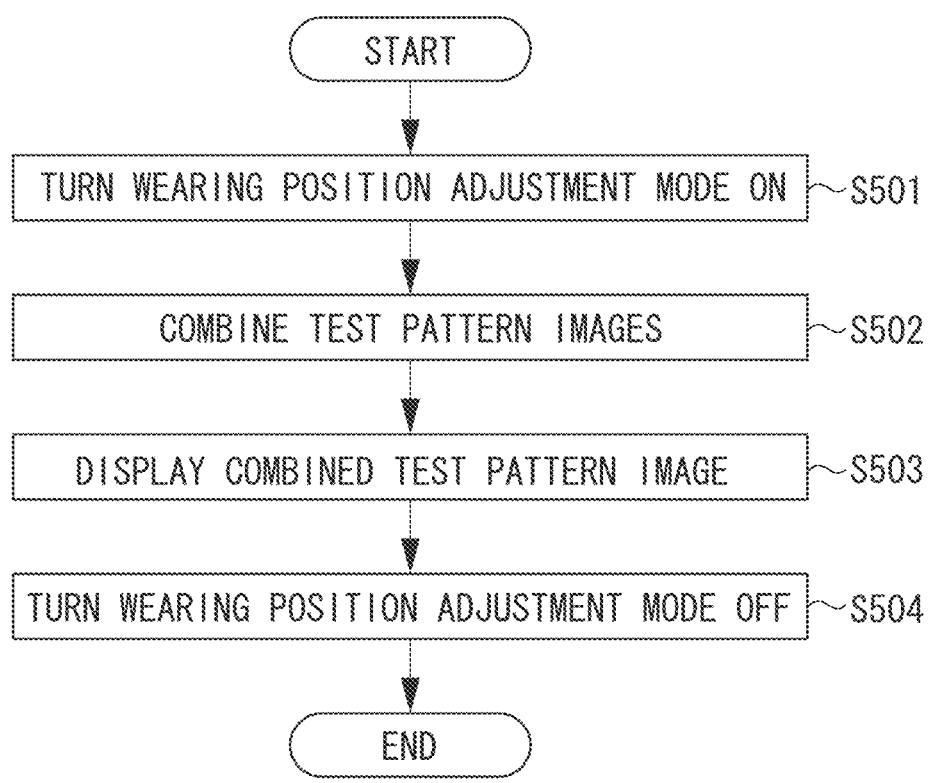
FIG. 5 is a flowchart illustrating processing of adjusting the wearing position of the HMD according to the first exemplary embodiment.

FIG. 5 is a flowchart illustrating processing for adjusting the HMD 101 wearing position in the image display system according to the present exemplary embodiment. In step S501, when an instruction for selecting the wearing position adjustment mode is issued from the HMD 101 user via the operation unit 202, the CPU of the image generation apparatus 103 selects the wearing position adjustment mode. Although, in the present exemplary embodiment, the wearing position adjustment mode is selected when the instruction from the HMD 101 user is issued, the wearing position adjustment mode can be selected at other times, such as at the time of system activation.

In step S502, the image combining unit 207 combines the test pattern images with content images (first and second images). The images combined with the test patterns are sent out to the HMD 101 by the CPU of the image generation apparatus 103 via the controller 102.

In step S503, the image display units 201L and 201R of the HMD 101 acquire the images combined with the test patterns via the communication control unit 203 and display the acquired images. While monitoring the test patterns displayed on the image display units 201L and 201R of the HMD 101, the HMD 101 user adjusts the position of the HMD 101 so that the test patterns appear clear. This procedure enables easily adjusting the wearing position of the HMD 101.

When the HMD 101 user has adjusted the HMD 101 to the suitable wearing position, the HMD 101 user issues an instruction to end the wearing position adjustment mode via the operation unit 202. In step S504, upon receipt of the instruction to end the wearing position adjustment mode, the CPU of the image generation apparatus 103 changes the operation mode from the wearing position adjustment mode to the normal mode. In the normal mode, the image combining unit 207 outputs the content images, input from the image reproduction unit 205, as they are.

According to the configuration of the present exemplary embodiment, a user can accurately adjust the wearing position of the HMD 101 even if the left and right images (first and second images) corresponding to both the user's eyes are shifted in the depth direction. In particular, the present exemplary embodiment enables displaying patterns having the same shape at the same positions in the first and second images displayed on the image display units 201L and 201R, respectively. When the HMD 101 is worn while shifted in the depth direction, one pattern is observed as a blurry image smaller than the normal state and the other pattern is observed as a blurry image larger than the normal state. According to the present exemplary embodiment, this procedure enables the user to easily perceive that the HMD 101 is not correctly worn.

Although, in the above-described example, the graphics of the test patterns are double circle graphics, the test patterns are not limited thereto, and can have other shapes, such as triangles and squares. Although, in the above-described example, the test patterns are black graphics displayed on a white background, the test patterns are not limited thereto, and can be displayed in other color combinations.

Although, in the above-described example configuration, the image display units 201L and 201R of the HMD 101 each include an optical system, the present exemplary embodiment is also applicable to a case where the image display units 201L and 201R do not include an optical system. In this case, since the test patterns to be combined with the first and the second images have the same graphics, the user observes the two graphics of the test patterns in an overlapping manner if there is no distance difference between the user's left and right eyes and the image display units 201L and 201R, respectively, in the depth direction. If there is a distance difference therebetween, the two graphics appear different in size and therefore observed without overlapping. By perceiving the difference in the view of the graphics of the test patterns, the HMD 101 user can adjust the HMD 101 to the suitable wearing position.

Although, in the above-described example, the graphics of the test patterns are combined with the content images before displaying the test patterns, just the test patterns can be displayed in the wearing position adjustment mode. In other words, just the test patterns are displayed as the first and the second images on the image display units 201L and 201R of the HMD 101, respectively. In this case, the image combining unit 207 for combining the graphics of the test patterns with the content images can be replaced with a configuration for switching between transmission of just the test pattern images and transmission of the content images to the HMD 101 depending on the normal mode and the wearing position adjustment mode.

A technique for achieving image presentation with a wide angle of view is discussed in Japanese Patent Application Laid-Open No. 2003-337299, where display images having different angles of view on the left and right eyes partially overlap the angles of view at the central portions on the left and right eyes. In the above-described example configuration of the present exemplary embodiment, the first and the second images having the same display range (angle of view) are displayed in an overlapping manner over the entire display area. This configuration enables the user to observe images having a wider angle of view than in a case where images having the same angle of view are displayed on the left and right eyes. The present exemplary embodiment is also applicable to the HMD 101 having the above-described configuration. In this case, the same patterns are displayed in the central area (common area) where the left and right images overlap, for example, at the four corners in the central areas.

A second exemplary embodiment will be described below. The second exemplary embodiment enables differentiation in color of the graphics of the test patterns to be displayed in the content images (first and second images) corresponding to both of the HMD 101 user's eyes. In the following descriptions, identical elements already described in the first exemplary embodiment are assigned the same reference numerals, and redundant descriptions thereof will be omitted.

Figure 6A:
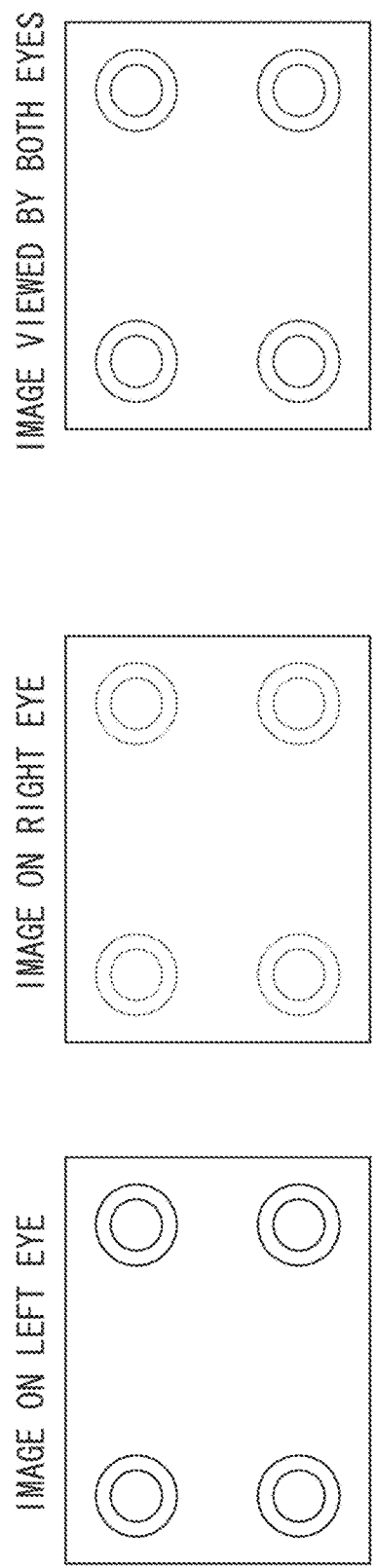
FIGS. 6A and 6B illustrate how test patterns appear when an HMD is worn at the suitable position according to a second exemplary embodiment.
Figure 6B:
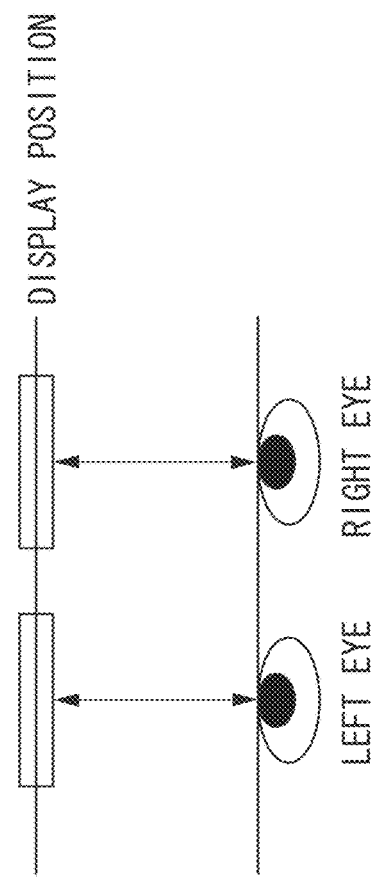

FIGS. 6A and 6B illustrate how the test patterns appear when the user wears the HMD 101 at the suitable position according to the present exemplary embodiment. As illustrated in FIG. 6A, according to the present exemplary embodiment, the test patterns differentiated in color are displayed in the content images (first and second images) respectively corresponding to the user's left and right eyes. As illustrated in FIG. 6B, when the user wears the HMD 101 at the suitable position, the corresponding graphics (double circles) of the two test patterns overlap each other so that the user observes the graphics (double circles) of one color.

Observing such a condition of the test patterns enables the HMD 101 user to recognize that the HMD 101 is worn at the suitable position.

FIGS. 7A and 7B illustrate how the test patterns appear when the user wears the HMD 101 at an unsuitable position according to the present exemplary embodiment. As illustrated in FIG. 7B, when the HMD 101 is worn at an unsuitable position and both of the user's eyes are shifted from the image display units 201L and 201R of the HMD 101 in the depth direction, the graphics of the left and right test patterns blur in different ways, similar to the first exemplary embodiment. In such a state, since the left and right graphics are different in color, the user observes the blurry test patterns of two different colors, as illustrated in FIG. 7A. The test patterns according to the present exemplary embodiment enable the user to determine the shift of the wearing position of the HMD 101 based not only on the blurriness level but also on the color information, making it easier for the user to adjust the wearing position of the HMD 101.

According to the present exemplary embodiment, the test patterns having the same graphics of different colors are displayed at corresponding positions on the left and right images (first and second images) of the HMD 101. With this configuration, if both of the HMD 101 user's eyes are shifted from the image display units 201L and 201R of the HMD 101 in the depth direction, the user is able to perceive that the HMD 101 is not worn at the suitable position based on the blurriness level and the color information (view of two different colors), making it easier to adjust the wearing position of the HMD 101.

A third exemplary embodiment of the present invention is described below. The third exemplary embodiment enables displaying the graphics of the test patterns and sample images on the image display units 201L and 201R in the wearing position adjustment mode. In the following descriptions, identical elements already described in the first and the second exemplary embodiments are assigned the same reference numerals, and redundant descriptions thereof will be omitted.

Figure 8A:
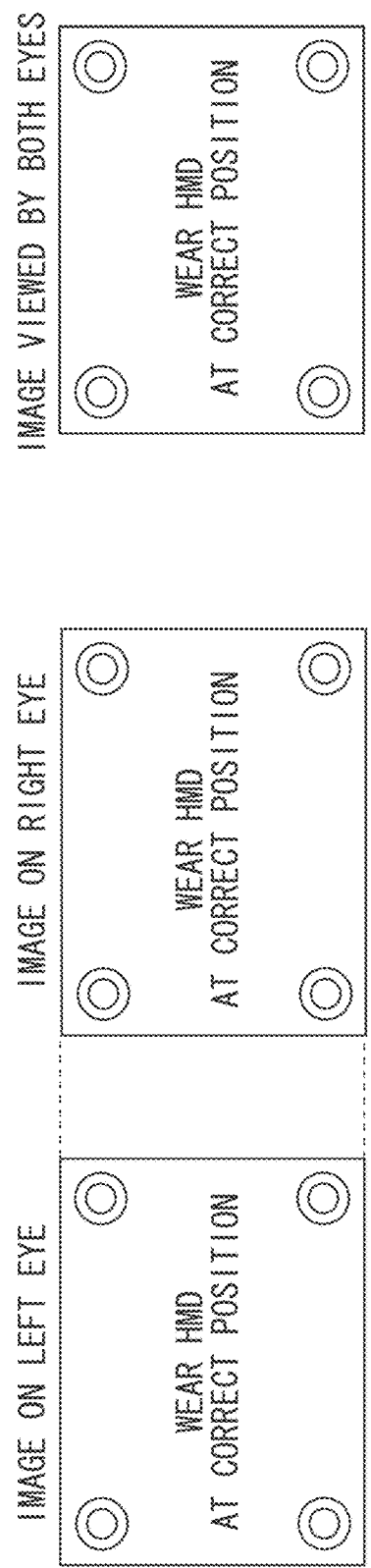
FIGS. 8A and 8B illustrate how test patterns appear when an HMD is worn at the suitable position according to a third exemplary embodiment.
Figure 8B:
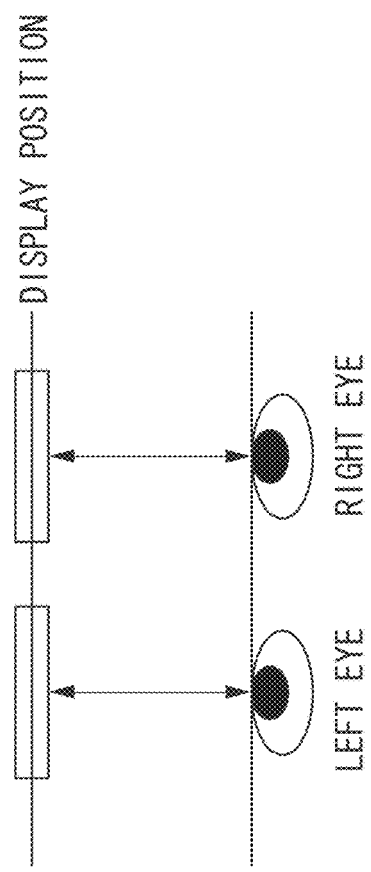

FIGS. 8A and 8B illustrate how the test patterns appear when the user wears the HMD 101 at the suitable position according to the present exemplary embodiment. In the wearing position adjustment mode according to the present exemplary embodiment, instead of combining the test patterns with the content images, just the test patterns are displayed on the image display units 201L and 201R of the HMD 101. In the test patterns according to the present exemplary embodiment, as illustrated in FIG. 8A, the same graphics (double circles) are displayed at the four corners in each of the left and right images, similar to the first exemplary embodiment. As illustrated in FIG. 8B, when the user wears the HMD 101 at the suitable position, the corresponding graphics (double circles) of the two test patterns overlap each other, so that the user observes each of the graphics overlapping the corresponding graphic as one graphic. Observing such conditions of the test patterns enables the HMD 101 user to recognize that the HMD 101 is worn at the suitable position.

In the present exemplary embodiment, as illustrated in FIG. 8A, the displayed test pattern images include a sample image at the center thereof. Examples of sample images include a CG image and text such as an operating instruction in the wearing position adjustment mode, as illustrated in FIG. 8A. This configuration enables the HMD 101 user to adjust the wearing position of the HMD 101 while confirming how images are displayed in the normal mode. The position at which a sample image is displayed is not limited to the center of each image, and can be any other position that does not overlap with the graphics at the four corners.

According to the present exemplary embodiment, the same graphics as well as sample images can be displayed at the same corresponding positions in the left and right images. This enables the HMD 101 user to adjust the wearing position of the HMD 101 while confirming how images are displayed in the normal mode.

Other Embodiments

Embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

The above-described configuration according to an exemplary embodiment enables correctly adjusting the wearing position of the HMD 101 even when the left and right images of the HMD 101 are shifted in the depth direction.

While exemplary embodiments have been described, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-009307, filed Jan. 20, 2016, which is hereby incorporated by reference herein in its entirety.

What is claimed is:

1. An image display apparatus comprising:
  a first display device, corresponding to a left eye of a user and having a first positional relation with the left eye, configured to display a first image;
  a second display device, corresponding to a right eye of the user and having a second positional relation with the right eye, configured to display a second image; and
  a control unit configured to perform control to generate combined images by combining computer graphics (CG) patterns each having a same shape at corresponding positions in the first and the second images and a different color with the first and the second images and display the combined images in a first case when the first and second positional relations are at a suitable position and in a second case when the first and second positional relations are at an unsuitable position where both eyes of the user are shifted from the first and second display devices in the depth direction, and wherein, when the user views the combined images with both eyes, in the first case, the patterns appear to overlap with each other so that the user observes the patterns of one color, and in the second case, the user observes blurry patterns of two different colors.

2. The image display apparatus according to claim 1, wherein the first and the second images are content images including information other than the patterns.

3. The image display apparatus according to claim 2, wherein the content images include text information such as an operating instruction in the wearing position adjustment mode of the image display apparatus.

4. The image display apparatus according to claim 1, further comprising,
   a first optical system corresponding to the first display device, and
   a second optical system corresponding to the second display device.

5. The image display apparatus according to claim 3, wherein the control unit displays the combined images in response to user instruction for selecting the wearing position adjustment mode.

6. The image display apparatus according to claim 1, wherein the image display apparatus is a head mount display (HMD), and wherein the patterns each have a shape of a double circle, and when the HMD is worn being shifted in the depth direction, one pattern of the patterns is observed as a blurry image smaller than the normal state and the other pattern is observed as a blurry image larger than the normal state, in the second case.

7. An image display method comprising:
   displaying a first image via a display device corresponding to a left eye of a user and having a first positional relation with the left eye;
   displaying a second image via a display device corresponding to a right eye of the user and having a second positional relation with the right eye; and
   generating combined images by combining computer graphics (CG) patterns each having a same shape at corresponding positions in the first and the second images and a different color with the first and the second images and displaying the combined images in a first case when the first and second positional relations are at a suitable position and in a second case when the first and second positional relations are at a suitable position and in a second case when the first and second positional relations are at an unsuitable position where both eyes of the user are shifted from the first and second display devices in the depth direction, and wherein, when the user views the combined images with both eyes, in the first case, the patterns appear to overlap with each other so that the user observes the patterns of one color, and in the second case, the user observes blurry patterns of two different colors.

8. The image display method according to claim 7, further comprising displaying the patterns each having the same shape at four corners of the first and the second images.

9. The image display method according to claim 7, wherein the first and the second images are content images including information other than the patterns.

10. The image display method according to claim 9, wherein the content images include text information such as an operating instruction in the wearing position adjustment mode of the image display apparatus.

11. The image display method according to claim 10, further comprising displaying the patterns in response to user instruction for selecting the wearing position adjustment mode.

12. The image display method according to claim 7, the image display apparatus is a head mount display (HMD), and wherein the patterns each have a shape of a double circle, and when the HMD is worn being shifted in the depth direction, one pattern of the patterns is observed as a blurry image smaller than the normal state and the other pattern is observed as a blurry image larger than the normal state, in the second case.

13. A non-transitory computer readable storage medium storing computer executable instructions for causing a computer to execute an image display method, the image display method comprising:
   displaying a first image via a display device corresponding to a left eye of a user and having a first positional relation with the left eye;
   displaying a second image via a display device corresponding to a right eye of the user and having a second positional relation with the right eye; and
   generating combined images by combining computer graphics (CG) patterns each having a same shape at corresponding positions in the first and the second images and a different color with the first and the second images and displaying the combined images in a first case when the first and second positional relations are at a suitable position and in a second case when the first and second positional relations are at an unsuitable position where both eyes of the user are shifted from the first and second display devices in the depth direction, and wherein, when the user views the combined images with both eyes, in the first case, the patterns appear to overlap with each other so that the user observes the patterns of one color, and in the second case, the user observes blurry patterns of two different colors.

14. The image display apparatus according to claim 1, wherein the CG patterns include the CG patterns at circumferential positions of the first and the second images.

15. The image display apparatus according to claim 14, wherein the circumferential positions correspond to four corners of the first and the second images.

16. The image display method according to claim 7, wherein the CG patterns include the CG patterns at circumferential positions of the first and the second images.

17. The image display method according to claim 16, wherein the circumferential positions correspond to four corners of the first and the second images.

* * * * *